Feb. 6, 1968  R. S. EMERSON  3,367,176
APPARATUS FOR TESTING THE OUTPUT OF THE FUEL PUMPS
OF COMPRESSION IGNITION ENGINES
Filed Oct. 13, 1965  2 Sheets-Sheet 1
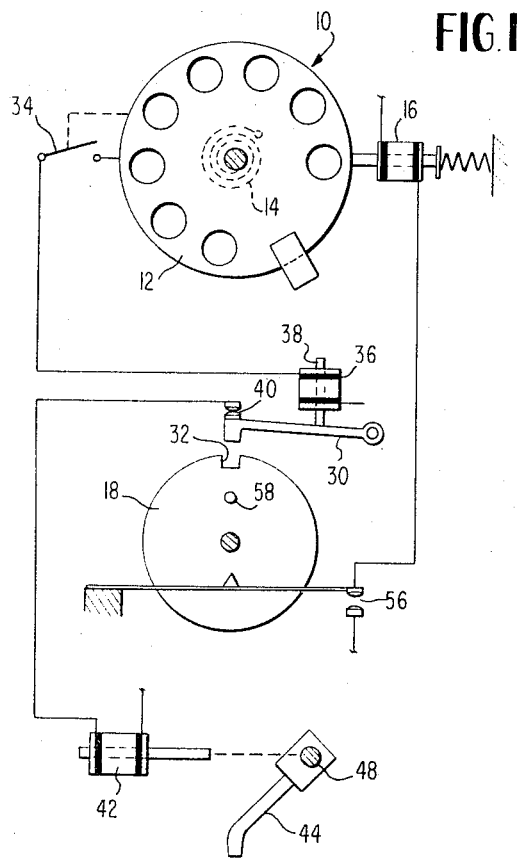
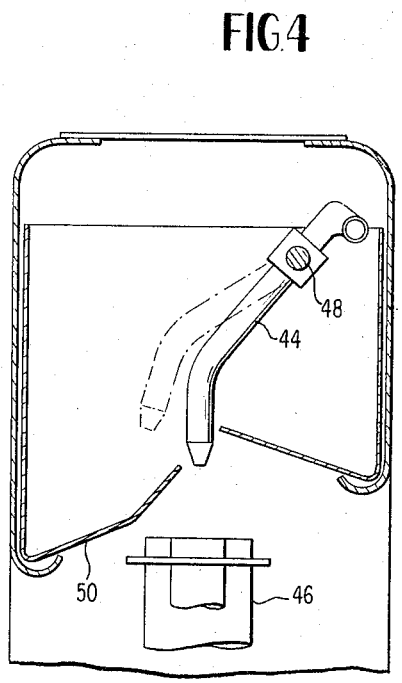
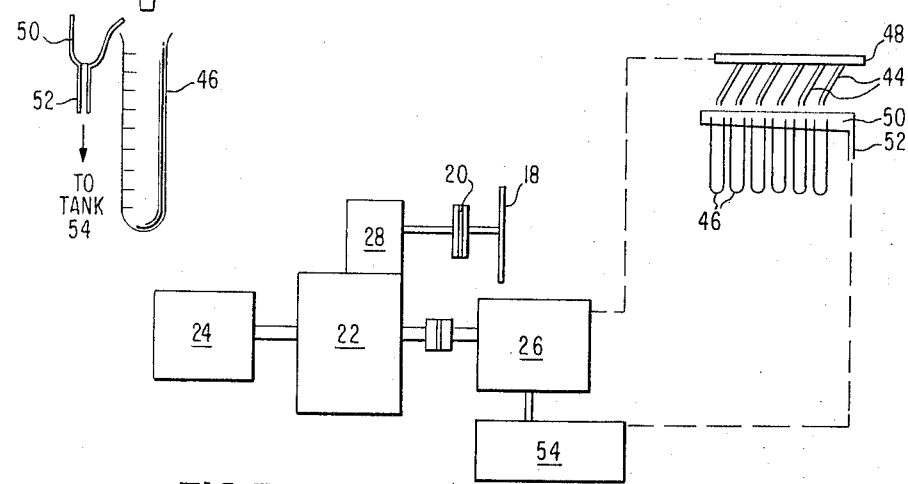
INVENTOR
REGINALD STANLEY EMERSON
BY  ATTORNEYS Feb. 6, 1968  R. S. EMERSON  3,367,176
APPARATUS FOR TESTING THE OUTPUT OF THE FUEL PUMPS
OF COMPRESSION IGNITION ENGINES
Filed Oct. 13, 1965  2 Sheets-Sheet 2

INVENTOR
REGINALD STANLEY EMERSON

BY
ATTORNEYS ated Feb. 6, 1968

3,367,176
APPARATUS FOR TESTING THE OUTPUT OF
THE FUEL PUMPS OF COMPRESSION IGNI-
TION ENGINES
Reginald S. Emerson, 34 Highlands Road, Buckingham,
Buckinghamshire, England
Filed Oct. 13, 1965, Ser. No. 495,539
Claims priority, application Great Britain, Oct. 14, 1964,
41,918/64
5 Claims. (Cl. 73—119)

ABSTRACT OF THE DISCLOSURE

A device for testing the output of compression ignition engine fuel pumps comprising a timing mechanism having a rotatable element arranged to be driven by pump driving means through an angular distance corresponding to a selected number of pump shaft revolutions, in which selection of the angular distance through which the rotatable element is rotated is effected by means of a dial mechanism or similar device.

This invention relates to apparatus for testing the output of the fuel pumps (fuel feed pumps and fuel injection pumps) of compression ignition engines.

In our prior British Patent No. 775,586 we have described apparatus for testing the output of compression ignition engine fuel pumps which comprises means for driving the pumps, a number of graduated measuring tubes for receiving oil discharged by the pump through nozzles, and timing mechanism which is driven in synchronism with the pump driving means and which, after a predetermined number of pump shaft revolutions, operates a deflector arranged to direct the oil discharged by the nozzles away from the measuring tubes. A control lever or other control member on the apparatus is arranged to be manually displaced by the operator so as to set the deflector into a position where the oil discharged by the nozzles flows into the measuring tubes, and the timing mechanism is arranged to hold the deflecting means in that position until such time as the pump shaft has completed the predetermined number of revolutions following the displacement of the control lever. For this purpose the timing mechanism takes the form of a rotatable element arranged to be frictionally driven through a drive mechanism connected to the pump driving means and to be releasably held against rotation by a movable stop. This stop is connected to the control lever so as to release the rotatable element on displacement of the control lever and is also connected to the deflector so as to hold the latter in the position where it allows delivery of oil into the measuring tubes while the rotatable element is in its "released" conition. When however the stop moves back into a position in which it holds the rotatable element against rotation, the stop causes the deflector to move into a position where it prevents the flow of oil into the measuring tubes until the operator again actuates the control lever.

The present invention is a development of this form of fuel pump testing apparatus and has as its aim the provision of means which enable the predetermined number of pump shaft revolutions to be selected in a particularly convenient way, while at the same time avoiding some of the mechanical linkages which are used in the specific appartus described and shown in the complete specification of British Patent No. 775,586.

According to the invention, apparatus for testing the output of compression ignition engine fuel pumps comprises a number of measuring containers for receiving oil delivered by the pump under test through a number of nozzles, and a timing mechanism having a rotatable element arranged to be driven by pump driving means through an angular distance corresponding to a selected number of pump shaft revolutions, in which selection of the angular distance through which the rotatable element is rotated is effected by means of a dial mechanism or similar device having a dial or other movable member which can be set in a number of different positions corresponding to different angular displacements of the rotatable element and which is restored automatically to its initial position of rest by the time the rotatable element has completed the selected angular displacement.

Preferably the dial or other movable member is restored to its initial position of rest in a rotary step-by-step movement while the rotatable element is rotating, each step taking place after the rotatable element has rotated through a predetermined angular distance. For example, each complete revolution of the rotatable element can correspond to, say, 100 revolutions of the pump shaft, and each step of the dial can take place after one complete revolution of the rotatable element. In this respect the dial mechanism differs from that on a telephone, in that the dial remains in its selected position and does not return to its position of rest until after the rotatable element has started to rotate.

Specific apparatus in accordance with the invention is shown by way of example in the accompanying drawings, in which:

FIGURE 1 is a diagrammatic view of the apparatus;

FIGURE 4 is a vertical section through part of the nozzle or spout mechanism; and FIGURE 5 is a schematic illustration of the apparatus showing the various drive connections and liquid-flow connections.

Figure 2:
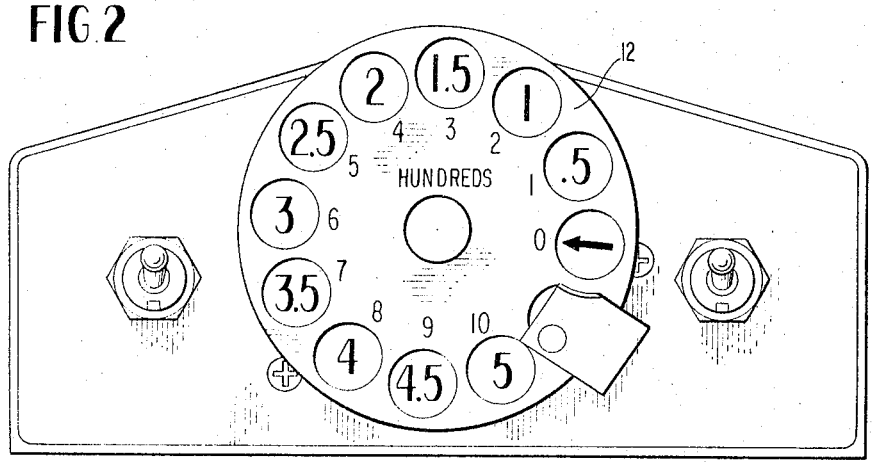
FIGURE 2 is a face-on view of the dial mechanism.
Figure 3:
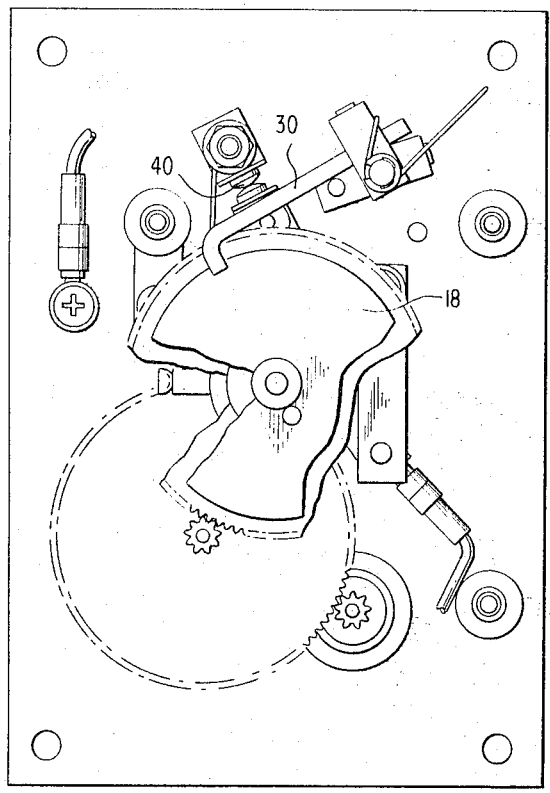
FIGURE 3 is a part-sectional side view of the timing mechanism with a back-plate of the casing removed.

The testing apparatus shown in the drawings includes dial mechanism 10 comprising a rotary dial 12 which is numbered and operated in a similar manner to the dial on a telephone. Thus, the dial can be rotated by hand through any one of, say, ten different angular distances, the greatest angular distance corresponding to ten complete revolutions of the rotatable element of the timing mechanism, and the smallest angular distance corresponding to one complete revolution of the rotatable element. Rotation of the dial 12 out of its position of rest is opposed by a spring 14 which serves to return the dial to that position, but the immediate return of the dial is prevented by the spring-loaded core of a solenoid 16 which either directly or indirectly holds the dial against rotation once it has been displaced and released by the operator.

Energization of the solenoid 16 is controlled by timing mechanism which has some resemblance to the timing mechanism shown in the complete specification of British Patent No. 775,586. Thus, the mechanism comprises a rotatable disc 18 arranged to be driven through a slipping clutch 20 (see FIGURE 5) by a drive mechanism 22 connected to means such as a motor 24 for driving the pump 26 under test, the drive mechanism 22 being provided with reduction gearing 28 so that, when the clutch 20 is properly engaged, the rotatable disc 18 is rotated through one complete revolution for every 100 revolutions of the pump shaft. Normally the disc 18 is held against rotation by a pawl 30 or other stop which engages a slot, hole or projection 32 in or on the disc, but when the dial 12 of the dial mechanism 10 is moved out of its position of rest the dial closes an electric switch 34 which energizes a solenoid 36 having a core 38 directly or indirectly connected to the pawl 30. The effect of this solenoid 36 being energized is that the pawl 30 is lifted out of engagement with the slot, hole or projection 32 on the disc, with the result that the disc is able to rotate.

Besides allowing the rotatable disc 18 to rotate, lifting of the pawl 30 closes another electric switch 40 which causes a third solenoid 42 to be energized. This solenoid 42 controls the delivery of oil from a number of nozzles 44 connected to the delivery side of the pump under test to a number of graduated measuring tubes 46 which are arranged in a line at eye-level height. Thus, energization of the third solenoid 42 causes it to move a number of delivery nozzles or spouts 44 into a position where they deliver oil from the pump into the graduated tubes 46. For this purpose the nozzles or spouts 44 are ganged together on a common shaft 48 which is rotated by the solenoid 42 through about 20° so as to swing the nozzles downwards out of a position where any oil delivered by them goes into a trough 50 and is then drained back through a pipe 52 to the supply tank 54.

The apparatus described above operates in the following manner.

The fuel pump 26 to be tested is coupled to driving means forming part of the apparatus, the driving means here being in the form of the electric motor 24 and a variable-speed transmission gear. The suction side of the pump 26 is connected to the source 54 of fuel oil, with the result that the pump delivers oil to the nozzles 44 connected to its delivery side. At this stage of the testing procedure the nozzles are in such a position that they deliver the oil fed to them into the common trough 50 mounted alongside the upper ends of the graduated measuring tubes 46. This trough 50 has a drain pipe 52 leading back to the source of supply so that the oil received by the trough is returned to that source.

The operator then decides on the number of revolutions he wishes the pump shaft to make during the first test. He may decide, for example, that the pump shaft should make 800 revolutions, in which case he dials the number "8" on the dial 12. The movement of the dial 12 out of its zero position (its position of rest) into position "8" immediately closes the switch 34 which controls energization of the pawl-lifting solenoid 36, with the result that the latter is energized and lifts the pawl 30 away from the slot, hole or projection 32 on the rotatable disc 18 of the timing mechanism. This permits the disc 18 to rotate by reason of its clutch engagement 20 with the pump driving means 22, 24. At the same time the lifting of the pawl 30 closes the switch 40 which controls energization of the nozzle-moving solenoid 42, with the result that this solenoid is energized and swings the nozzles 44 through an angle of about 20° so that the oil being discharged through them now flows into the graduated measuring tubes 46.

The timing mechanism is accordingly operating while the oil delivered by the pump under test is flowing into the measuring tubes.

After the rotatable disc 18 has completed a part, say one-half, of one complete revolution (which, as stated above, corresponds to 100 revolutions of the pump shaft), a switch 56 in the timer mechanism is closed by a pin 58 on the disc 18 so as to energize the solenoid 16 in the dial mechanism. The energization of the solenoid is only momentary, but it is sufficient for the solenoid core to be withdrawn so that the dial 12 is able to move one half step back towards its position of rest. The solenoid 16 is then quickly de-energized so that the solenoid core returns to its original position and thus permits the dial 12 to move back the remaining half-step. The system conveniently operates in a similar manner to a clock escapement thereby preventing the dial from moving more than one step at a time. The dial is now in the position "7" which corresponds to 700 revolutions of the pump shaft.

Energization of the dial mechanism solenoid 16 takes place in this manner after each subsequent complete revolution of the rotatable disc 18, so that the dial gradually returns to its zero position under the effect of the spring 14 which urges it into that position. The movement of the dial is therefore a rotary step-by-step movement.

After the rotatable disc 18 has completed 7½ complete revolutions in the typical test with which we are here concerned the dial mechanism solenoid 16 is energized for the last time. The dial 12 now moves into its zero position, thus opening the switch 34 which controls energization of the pawl-lifting solenoid 36. This causes the latter solenoid to be de-energized, with the result that the pawl 30 is now free to engage the slot, hole or projection 32 on the rotatable disc 18. It does not however stop rotation of the disc immediately, as the slot, hole or projection 32 on the disc is clear of the pawl 30 at this particular juncture. The disc 18, therefore continues to rotate until it has completed its eighth revolution, at the end of which the pawl 30 engages the slot, hole or projection 32 in the disc and stops its rotation. This movement of the pawl also opens the switch controlling the energization of the nozzle-moving solenoid 42 so that the latter is de-energized and allows the nozzles 44 to swing out of their position in which they deliver oil into the graduated measuring tubes 46.

The operator therefore knows that the oil which has collected in the measuring tubes 46 in that delivered by the pump 26 during 800 revolutions of the pump shaft. This allows him to check whether the quantity delivered into each tube matches up to that which is delivered by the pump when it and the fuel injection nozzles are in proper working condition.

An important advantage of the apparatus described above," quite apart from its simplicity and the ease with which it can be used, is that the electrical nature of the connections between the timing mechanics, the dial mechanism and the nozzle-moving mechanism allow these components to be mounted at the most convenient positions on the apparatus and not necessarily all together.

A number of modifications can be made to different parts of the apparatus. Thus, the dial 12 need not revert to its zero position in a step-by-step movement, but can be arranged to return to that position in a smooth continuous movement in accordance with electrical signals fed to it from the timing mechanism. Selsyn or magslip motors could be used to achieve such a return motion of the dial. Similarly, although a slipping clutch 20 for driving the rotatable disc 18 of the timing mechanism has several advantages, it is possible to use some other form of releasable coupling between the pump driving means and the disc.

I claim:

1. Apparatus for testing the output of compression ignition fuel pumps comprising: means for driving a pump to be tested, a fuel reservoir having an outlet adapted to be connected to an inlet on the pump to be tested, a plurality of nozzles adapted to be connected to the delivery side of the pump to be tested, a plurality of measuring containers positioned beneath said nozzles, one container beneath each nozzle, whereby fuel delivered by said nozzles may be delivered at selected times into said measuring containers, a timing mechanism including a rotatable element, a slipping clutch connected between said rotatable element and said pump-driving means whereby said rotatable element may be driven by said pump driving means through an angular distance corresponding to a selected number of pump shaft revolutions, said clutch providing slippage whereby said driving means continue to drive said pump whenever said rotatable element is held against rotation, rotation-preventing means arranged to act on and prevent rotation of said rotatable element of said timing mechanism, a dial mechanism the dial whereof is adapted to be set in any selected one of a plurality of different positions corresponding to different angular displacements of said rotatable element, means connecting said dial mechanism to said rotation-preventing means to render said rotation-preventing means inactive when said dial is set in any one of said different positions, restoring means on said dial mechanism for restoring said dial from any one of said different positions to a position of rest, means arranged to act on and impede movement of said dial back to said position of rest, a switch mechanism connected between said rotatable element and said dial-impeding means, switch-actuating means associated with said rotatable element for actuating said switch mechanism to render said dial-impeding means inactive once said rotatable element has been rotated through an angular distance determined by the setting of said dial, nozzle-positioning means for moving said nozzles into a position wherein fuel delivered through said nozzles passes into said measuring containers, a second switch mechanism, means connecting said second switch mechanism to said nozzle-positioning means so as to cause movement of said nozzles when the switch of said last-mentioned switch mechanism is actuated, and switch actuating means associated with said rotation-preventing means for actuating said second switch mechanism when said rotation-preventing means are inactive whereby the delivery of fuel into said measuring containers takes place only during such times that said rotatable element of said timing mechanism is rotating.

2. Apparatus according to claim 1, wherein said restoring means for restoring said dial to a position of rest comprise a spring acting on said dial, and said dial-impeding means comprise a solenoid having a core adapted to engage said dial and impede rotation thereof.

3. Apparatus according to claim 1, wherein said rotation-preventing means arranged to act on said rotatable element comprise a solenoid-operated stop which engages a shaped portion of the rotatable element.

4. Apparatus according to claim 1, wherein the nozzles are ganged together on a common shaft.

5. In an apparatus for testing the output of compression ignition fuel pumps which includes rotary drive means for a pump under test, measuring means for collecting the output of a pump under test, and control means for selectively directing the output to said measuring means, the improvement comprising:

timing means for accurately counting a preselected number of revolutions of said rotary drive means and for actuating said control means to direct the output to said measuring means only for the duration of said preselected number of revolutions, said timing means including a rotatable member, an overload release clutch connecting said rotatable member to said rotary drive means, stop means normally preventing rotations of said rotatable member and causing said clutch thereby to slip, actuating means for disengaging said stop means to allow said rotatable member to rotate, means actuated by disengagement of said stop means for actuating said control means to direct pump output to said measuring means, whereby measurement collection commences simultaneously with release of said rotatable member, a control dial having a rest position and means normally urging the dial to such rest position, means actuated in response only to disposition of said control dial in said rest position to disable said actuating means, friction means for holding said control dial in a selected partially rotated position away from said rest position thereof, and means actuated in response to every revolution of said rotatable member for momentarily releasing said friction means and allow said control disc to return toward said rest position by a predetermined angular amount.

References Cited

FOREIGN PATENTS 702,375   1/1954   Great Britain.
775,586   5/1957   Great Britain.

RICHARD C. QUEISSER, *Primary Examiner.*

JAMES GILL, *Examiner.*

JERRY W. MYRACLE, *Assistant Examiner.*